(12) United States Patent
Redei et al.

(10) Patent No.: US 9,191,625 B2
(45) Date of Patent: Nov. 17, 2015

(54) SYSTEM AND METHODS FOR TRANSMITTING AND DISTRIBUTING MEDIA CONTENT

(76) Inventors: Janos Redei, Basel (CH); Xiaohan Wang, Alameda, CA (US)

( * ) Notice: Subject to any disclaimer, the term of this patent is extended or adjusted under 35 U.S.C. 154(b) by 1377 days.

(21) Appl. No.: 12/567,739

(22) Filed: Sep. 26, 2009

(65) Prior Publication Data

US 2010/0083303 A1 Apr. 1, 2010

Related U.S. Application Data

(60) Provisional application No. 61/100,675, filed on Sep. 26, 2008.

(51) Int. Cl.
| | |
|---|---|
| *H04N 7/18* | (2006.01) |
| *H04N 7/173* | (2011.01) |
| *H04N 21/222* | (2011.01) |
| *H04N 21/258* | (2011.01) |
| *H04N 21/2743* | (2011.01) |

(52) U.S. Cl.
CPC ....... *H04N 7/17318* (2013.01); *H04N 21/2223* (2013.01); *H04N 21/25866* (2013.01); *H04N 21/25891* (2013.01); *H04N 21/2743* (2013.01)

(58) Field of Classification Search
USPC .............. 725/74, 86, 105, 115, 117, 118, 134
See application file for complete search history.

(56) References Cited

U.S. PATENT DOCUMENTS

| | | | |
|---|---|---|---|
| 6,584,450 B1 | 6/2003 | Hastings et al. | |
| 7,024,381 B1 | 4/2006 | Hastings et al. | |
| 7,830,388 B1 * | 11/2010 | Lu ................................. | 345/501 |
| 2002/0199208 A1 * | 12/2002 | Chang et al. ................... | 725/131 |
| 2003/0078986 A1 * | 4/2003 | Ayres et al. ................... | 709/217 |
| 2005/0204019 A1 | 9/2005 | Flynn et al. | |
| 2006/0031126 A1 * | 2/2006 | Ma et al. ......................... | 705/26 |
| 2006/0059045 A1 * | 3/2006 | Babbar et al. ................... | 705/14 |
| 2006/0187833 A1 * | 8/2006 | Montulli et al. .............. | 370/230 |
| 2006/0234762 A1 * | 10/2006 | Ozluturk ..................... | 455/552.1 |
| 2007/0070066 A1 * | 3/2007 | Bakhash ........................ | 345/419 |
| 2007/0150484 A1 * | 6/2007 | Funge et al. ..................... | 707/10 |
| 2007/0162487 A1 * | 7/2007 | Frailey ........................... | 707/102 |
| 2007/0192253 A1 * | 8/2007 | Gill et al. ......................... | 705/51 |
| 2007/0245882 A1 * | 10/2007 | Odenwald ....................... | 84/609 |
| 2008/0091526 A1 | 4/2008 | Shoemaker | |
| 2008/0091845 A1 * | 4/2008 | Mills et al. ..................... | 709/246 |
| 2008/0178234 A1 | 7/2008 | Eyal et al. | |

(Continued)

OTHER PUBLICATIONS

Hidenori Aoki, et al., "IEEE 802.11s Wireless LAN Mesh Network technology," NTT DoCoMo Technical Journal, 2006, pp. 13-21, vol. 8, No. 2., Japan.

(Continued)

*Primary Examiner* — Kyu Chae (57) ABSTRACT

A technique for distributing high-quality, user-generated high definition (HD) video content on the web is presented. A system according to the technique may include a service provider including a user database, a catalog database, and a media library. The service provider may receive the HD video content from a user through a content submission method. A method according to the technique receives registration information for the HD video content to be shared and receives the HD video content from a user through a content submission method. The HD video content may then be further processed, such as transcoding to a streamable format using a massively parallel cloud computing platform.

6 Claims, 6 Drawing Sheets

(56) References Cited

U.S. PATENT DOCUMENTS

2009/0106847 A1* 4/2009 Krupman et al. ............... 726/26
2009/0156181 A1* 6/2009 Athsani et al. ............. 455/414.2
2009/0307699 A1* 12/2009 Munshi et al. ................ 718/102
2011/0238631 A1* 9/2011 Cortes et al. .................. 707/687

OTHER PUBLICATIONS

Joseph D. Camp and Edward W. Knoghtly, "The IEEE 802.11s Extended Service Set Mesh Networking Standard," IEEE Communications Magazine, 46(8):120-126, Aug. 2008, USA.

* cited by examiner

SYSTEM AND METHODS FOR TRANSMITTING AND DISTRIBUTING MEDIA CONTENT

CROSS REFERENCE TO RELATED APPLICATION

The present application is related to and claims the benefit of priority of the following commonly-owned, provisional application: application Ser. No. 61/100,675, filed Sep. 26, 2008, entitled "System and Method for Online High Definition Video Content Distribution", of which the present application is a non-provisional application thereof. The disclosures of the forgoing application are hereby incorporated by reference in it entirely, including any appendices or attachments thereof, for all purposes.

BACKGROUND

High Definition (HD) video content distribution over a network requires a high bandwidth for both download and upload. Full HD (1080p) video content in a common compression format, such as H.264, has around five times the amount of data of a comparable Standard Definition (SD) video content. A video content in 720 p (720 horizontal lines, progressive scan) has around 2.5 times the amount of data compared with SD content. Most broadband data communication technologies, such as, for example, DSL or cable, are asymmetric, meaning that the downstream speed is higher than the upstream speed as seen from a user's point of view. The limited upstream bandwidth is a critical bottleneck for HD content delivery over the internet. Network architectures using optical fiber to replace all or part of the usual copper local loop used for telecommunications, such as symmetric fiber-to-the-home (FTTH), provide faster upload speeds, but are expensive and not very widespread.

HD video data may be converted to a different format and/or edited in order for the video data to be suitable for streaming over the internet. However, processing of HD video data is computing-intensive and may be difficult for a user to achieve.

The foregoing examples of the related art and limitations related therewith are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tools, and methods that are meant to be exemplary and illustrative, not limiting in scope. In various embodiments, one or more of the above-described problems have been reduced or eliminated, while other embodiments are directed to other improvements.

A technique for distributing high-quality, user-generated high definition (HD) video content on the web is presented. A system according to the technique may include a service provider managing a user database, a catalog database, and a media library. The service provider may receive the HD video content from a user through a content submission method.

In a non-limiting example, the content submission method may be mail-in, whereby the HD video content is stored on a portable storage medium and sent to the service provider. The portable storage medium includes, by way of example but not limitation, an optical disk, high capacity memory card, or portable hard disk. In another example, the content submission method may be a self-service kiosk, whereby the HD video content is transferred to the self-service kiosk. The HD video content is then transferred from the self-service kiosk to a remote processing center. In yet another example, the submission method may be direct upload, whereby the user uploads the HD video content directly to the remote processing center through a suitable broadband connection.

A method according to the technique receives registration information for the HD video content to be shared and receives the HD video content from a user through a content submission method. The HD video content may then be processed and transcoded to a stream-able format or to a format suitable for downloading. The submission method may use a wireless device-mediated direct upload mechanism, whereas the device transcodes the content on-the-fly. In one embodiment, the converted HD video content may be uploaded to third-party content delivery networks.

Various content submission methods, such as mail-in, self-service kiosk, and direct-upload, as well as the content presentation and advertising methods and systems are presented.

BRIEF DESCRIPTION OF THE DRAWINGS

Embodiments of the inventions are illustrated in the figures. However, the embodiments and figures are illustrative rather than limiting; they provide examples of the invention.

DETAILED DESCRIPTION

In the following description, several specific details are presented to provide a thorough understanding of embodiments of the invention. One skilled in the relevant art will recognize, however, that the invention can be practiced without one or more of the specific details, or in combination with other components, etc. In other instances, well-known implementations or operations are not shown or described in detail to avoid obscuring aspects of various embodiments, of the invention.

The approach described herein for post-processing and uploading large file-size video contents to a network burdened by heterogeneous bandwidth constraints, for subsequent sharing and related consumer advertising purposes, is applicable to any type of large data file post-processing and uploading application, such as applications involving the large datasets typically generated in the medical imaging field (video endoscopy, high-field and real-time magnetic resonance imaging etc); and in connection with various methods of monetization (such as pay-per-use, subscription, advertising-supported).

The approach is (without limitation) particularly well suited for distributing media-rich contents, such as high definition video files, on the internet. Throughout the disclosure, the term "media content" broadly refers to information or data that can be transmitted, stored, and/or distributed via various types of medium, such as the internet, television, audio/video CDs, films, cassettes, etc. In certain embodiments, media content may be stored in analog or digital formats. The invention may be implemented in computer software, or in hardware circuitry, or any combination of software and hardware components and is not limited to any specific software or hardware implementation.

Unless specifically stated otherwise as apparent from the following discussion, it is appreciated that throughout the description, discussions utilizing terms such as "transferring", "transmitting", "distributing", "copying" or "moving" or the like, refer to the action of creating a copy of data (such as a file or folder), residing on a first medium, onto a second medium via a certain content submission method. The data may remain on the first medium or may be erased from the first medium upon completion of the action of creating a copy on the second medium. For example, media content stored on a first computing device may be transferred and saved to a second computing device via a network connection. Alternatively, a legacy video cassette containing a video clip may be physically transferred to a processing center, with its video clip being digitized and copied to a DVD. The term "content submission method" broadly refers to a mechanism or an operation to transfer the media content from one place to another. For example, a content submission method may allow media content to be transmitted electronically via a network connection, or be physically delivered to a destination for further processing.

In one embodiment, a user may create an account with a service provider. The service provider may request personal information about the user, for instance, the user name, password, e-mail address, transaction processing information (for e-commerce, such as a physical/shipping address, mobile phone number, payment details), terms-of-service agreement with the service provider, or other information related to the user, or any combination thereof. Alternatively, the user account can be systematically or automatically created based on a user information database.

A user may register content with the service provider and send the content to the service provider. Upon registration of the content, the user may access progress information related to the progress of the content (e.g.: receipt confirmation, processing progress, availability for distribution) being transferred to or being processed on the service provider. In one embodiment, the progress information may be accessed from different locations. The progress information may be automatically transferred to the user's computer. The progress information may additionally, or instead, be stored on a server of the service provider, and a user may log into their account from an internet ready device and access the progress information and/or personal information.

In one embodiment, a user may be able to access their account (to which they previously signed up with the service provider), including any preference information, from more than one computing device. The user may have created the account, for example, on a home computer, and can access the account from a different device connected to the internet, such as, for example, a computer at an internet café, or from a self-service kiosk, as described later. The user may also change the personal information from any such device.

In one embodiment, a user transfers content through one of the various submission methods. Upon receiving the content, the service provider may process and/or edit the content, depending on the user's preference information. The preference information may have been provided to the service provider during account registration and/or during content registration. In a non-limiting example, the service provider may perform quality assurance of the content, thereby eliminating poor content and detecting copyright infringement.

In one embodiment, the service provider may distribute the content after the content has been processed and/or edited. Distribution may be available to the user that submitted the original content, or to other users connected to the service provider, or to both. Access to the content may also be restricted to certain users. The service provider may notify a user that the content is ready for distribution, make an entry in a catalog database about the content, update a user database to reflect that the content is ready for distribution, and store the content on a server of the service provider. Users may search the catalog database for rendered contents and download or stream contents, provided they have sufficient privileges. A content provider (e.g.: the user that registered the content and submitted it to the service provider) may choose to restrict access to the content, submitted by the content provider, before the content is made available (for example, during registration of the content), or may do so at any point after the content has been submitted (such as by updating content registration information by accessing the user database).

In one embodiment, after submitting the content to the service provider, the user is notified by the service provider; for instance, through an e-mail or text message sent to the user's mobile phone or smartphone (a phone with wireless internet access and PC-type features) when the user's content (such as HD video) is uploaded and available for viewing. In the example of the smartphone, such a notification mechanism may be implemented independently, or together with a separate software application available for downloading to the smartphone. In the latter implementation, the software application on the smartphone may for instance, allow the user to receive the notification, preview the content on the smartphone, and in turn notify other users (e.g., friends and associates) who utilize the smartphone application, that the content is available. Further, the notification mechanism may include metadata, such as location metadata (e.g., the location where the HD video has been recorded). Such location metadata, also called a geotag, may then be used to display the location information on a map, or for other purposes. Further, such a smartphone application may be distributed for a fee, or supported by an advertisement displayed on the smartphone application, or by other means of monetization.

The content described in this disclosure may be any large-size data, such as media-rich content. By way of example but not limitation, the content may be high definition video, high-resolution photos, or multi-channel surround sound recordings. In a non limiting example, the systems and methods described herein may be directed to delivery of files to the remote processing center of the service provider for subsequent generation/rendering of computer-generated animated movies in the entertainment industry, or of user-generated animated movies, submission of next-generation MRI scans for off-site teleradiologists to view the scans with a 3D immersive interface, submission of High-field MRI phenotype data for subsequent computer-aided diagnosis off-site, with or without utilizing DNA profile data. The content may be processed using a cloud computing architecture at the service provider.

Figure 1:
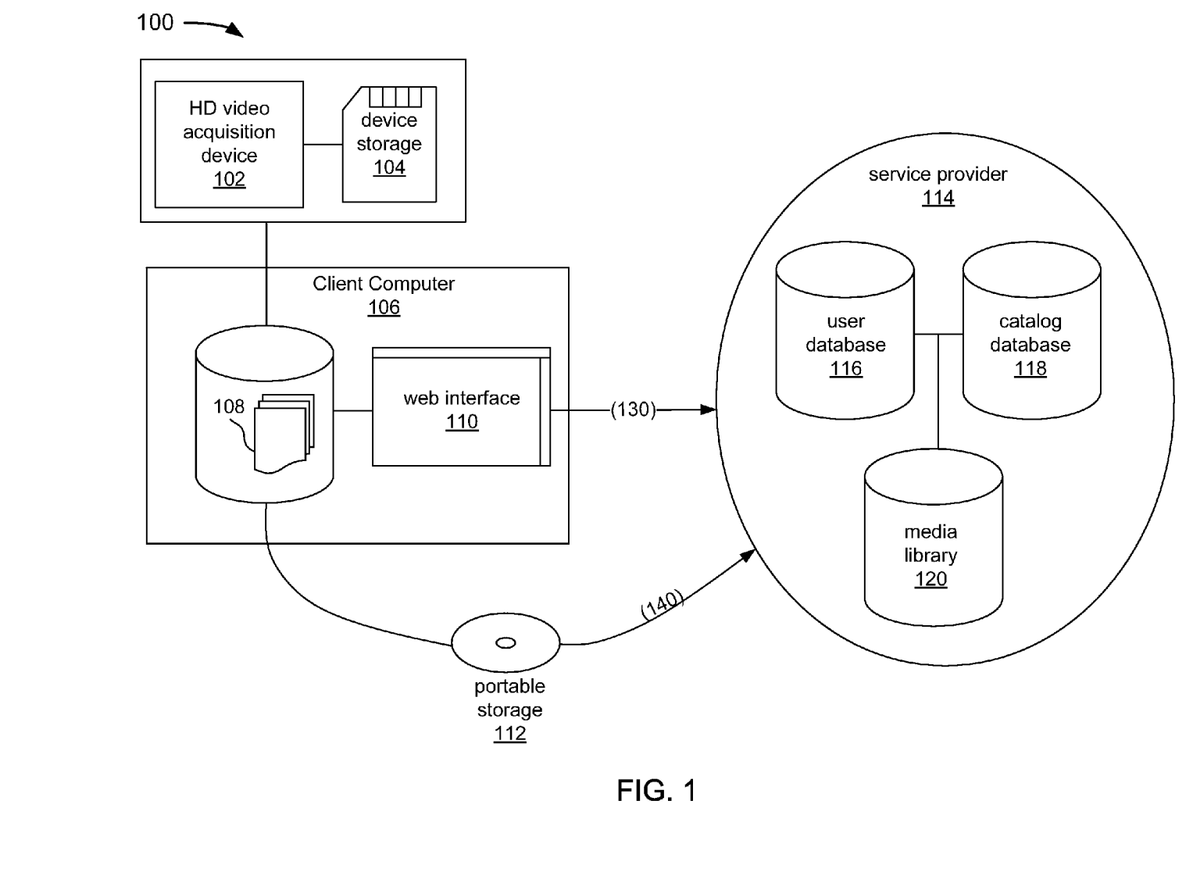
FIG. 1 depicts an example of a system for content submission using a "Mail-in" content submission method from an HD video acquisition device to a service provider's back-end server.

FIG. 1 depicts an example of a system for content submission using a "Mail-in" content submission method from an HD video acquisition device to a service provider's back-end server. The content submission system 100 includes HD acquisition device 102, device storage 104, client computer 106, content submission repository 108, web interface 110, portable storage 112, service provider 114, user database 116, catalog database 118, and media library 120. Further, the "Mail-in" content submission method 140 may be used to transmit the media content stored in the device storage 104 or the content submission repository 108 to the service provider 114, while information related to the media content may be transmitted separately to the service provider via a "Web-interface" submission method 130.

HD acquisition device 102 may be any device capable of recording video in a high definition, such as, in a non-limiting example, a camcorder or an HD capable mobile phone. Device storage 104 may be any storage medium onto which video recorded by HD acquisition device 102 may be stored. Device storage 104 may be integrated memory (built into HD acquisition device 102) or removable memory, such as a non-volatile high capacity memory card that can be removed from HD acquisition device 102. Alternatively, the device 102 may be an audio or video capturing device that stores the captured media in an analog format. For example, the device 102 can be a legacy video recorder which records and stores videos or images on a tape storage 104 (e.g., VHS tapes, etc).

Client computer 106 may be a general purpose computing device, such as a desktop, laptop, or smartphone, or any other computing device that can extract media content from the storage 104 of the device 102. In one embodiment, the computer 106 may be integrated into the media acquisition device 102, such as a smartphone with access to the internet. The computer 106 may also be a special-purpose computing device to acquire, store and transmit media content. For example, the computer 106 may contain 2-D or 3-D graphic authoring, rendering, and editing hardware/software to produce artificial media content such as cartoons or animations. The media content created on the computer 106 or acquired via device 102 may be stored and managed by a media content submission repository 108, which may be implemented based on a file folder, a directory, or a database management. In one embodiment, the content submission repository 108 may also be physically implemented with hard drives, memory, flash memory, or the combination thereof.

In the example of FIG. 1, an HD video content may be transferred from HD video acquisition device 102 to client computer 106. The HD video content may be transferred through a direct cable connection between client computer 106 and HD video acquisition device 102, such as a USB® or FIREWIRE® connection, through a wireless connection, such as Wi-Fi or BLUETOOTH®, or through indirect connection, such as by removing device storage 104, connecting device storage 104 to client computer 106, and transferring or copying data contained on storage device 104 to client computer 106. The HD video contents may then be stored in the content submission repository 108.

In one embodiment, the client computer 106 may transfer media content stored in the repository 108 to a service provider 114 for further processing. The service provider 114 may be implemented as a media processing and distributing server, and may include user database 116, catalog database 118, and media library 120, etc. Service provider 114 may further include means for receiving portable storage medium 112 and transfer the content stored on portable storage medium 112 onto the server. Additionally, a web interface 110 may be used, for example, to register the HD video content with service provider 114, so that the content registration information can be properly recorded. In one embodiment, service provider 114 is configured to enable users to search for available HD video content based on the content registration information. Service provider 114 may provide a data-driven website involving server components, such as user database 116 and catalog database 118.

In a non-limiting example, portable storage medium 112 may be any writable or rewritable medium, such as CD-R/RW, DVD R/RW, Blu-ray disc recordable (BD-R/RE), non-volatile memory (e.g.: Flash memory), solid state drive (SSD), or magnetic medium (e.g.: portable hard drive). Portable storage medium 112 is configured to contain HD video content or other media content. Portable storage medium 112 may additionally contain other data useful to the service provider, as will be explained later.

In one embodiment, content submission repository 108, including the HD video content, may be transferred to portable storage 112. This step may be performed by copying and pasting (such as drag-and-drop) the content submission repository 108, including the HD video content, from client computer 106 to portable storage medium 112, or may be performed using a dedicated software application. This application may also assist the user in tagging content submission repository 108.

In one embodiment, a user may record the HD video content with the device 102 and then register the recorded media content at the service provider 114 through a submission method 130. The user may then use a different computing device to put the HD video content on a portable storage medium 112. Further, the user may use a different submission method 140 to mail-in the device storage 104 or the portable storage 112, which contains the HD video content, to the service provider 114. Upon receiving the storage 104 or 112, service provider 114 may extract the media content from the storage and match the media content with the content registration information, by using, for example the user's name, account number, or any other information enabling service provider 114 to tie the HD video content to the content registration information.

In the example of FIG. 1, registration information received through web interface 110 may be stored in user database 116. Upon receiving portable storage medium 112, service provider 114 may match content submission repository 108, including HD video content, with registration information received through web interface 110. In one embodiment, catalog database 118 holds catalog entries of HD video contents available through service provider 114. Full-resolution original and/or processed/edited versions of the HD video content may be stored in media library 120.

In one embodiment, the submission method 130 and the submission method 140 are two separate information transmitting mechanisms for submitting data to the service provider 114. For example, the submission method 130 may be a conventional network connection provided by an Internet Service Provider (ISP) for accessing the Internet. In a typical configuration, the upload speed of the submission method 130 may be limited for transmitting data to the service provider 114. In other words, the submission method 130 may utilize network that exhibits a heterogeneous bandwidth constraint, in which the upstream (uploading) bandwidth is lower than the downstream (downloading) bandwidth. On the other hand, the media contents for HD video often require a large amount of storage, and take longer time for data transferring.

If transmitted via the submission method 130, the media contents may take a long period of time for uploading to the service provider 114. Further, long period of uploading may be easily interrupted by network glitches, or be restricted by the ISP. Thus, an alternative submission method, e.g., submission method 140, may be necessary to bypass the submission method 130 for uploading a large amount of data to the service provider 114.

In one embodiment, a submission method 140, which is separated from and bypasses the submission method 130, may shorten the uploading time, and greatly improve the reliability in transmitting a large amount of HD video content to the service provider 114. Thus, the submission method 130 and the submission method 140 may not share their respective communication paths with each other. In one embodiment, the submission method 130 has no access to the submission method 140 for data communication. During operation, the delivery of the portable storage medium 112, which contains the large media content data, may be sent to the service provider via postal service, courier service, drop-off at and collection from a retail store, or any means for sending the physical medium to service provider 114. Once the service provider 114 receives the portable storage medium 112 via submission method 140, it may extract information from the storage medium 112 and compare the information with the content information received from submission method 130 for content matching and upload progress monitoring purposes.

In one embodiment, the video acquisition device 102, the client computer 106, and/or the service provider 114 may utilize processor and memory for implementations. The processor may include central processing units (CPUs) to execute software or firmware stored in a memory. The processor(s) may be, or may include, one or more programmable general-purpose or special-purpose microprocessors, digital signal processors (DSPs), programmable controllers, application specific integrated circuits (ASICs), programmable logic devices (PLDs), or the like, or a combination of such devices. The memory represents any form of random access memory (RAM), read-only memory (ROM), flash memory (as discussed above), or the like, or a combination of such devices. In use, the memory may contain, among other things, a set of machine instructions which, when executed by processor, causing the processor to perform operations to implement embodiments of the present invention.

Figure 2:
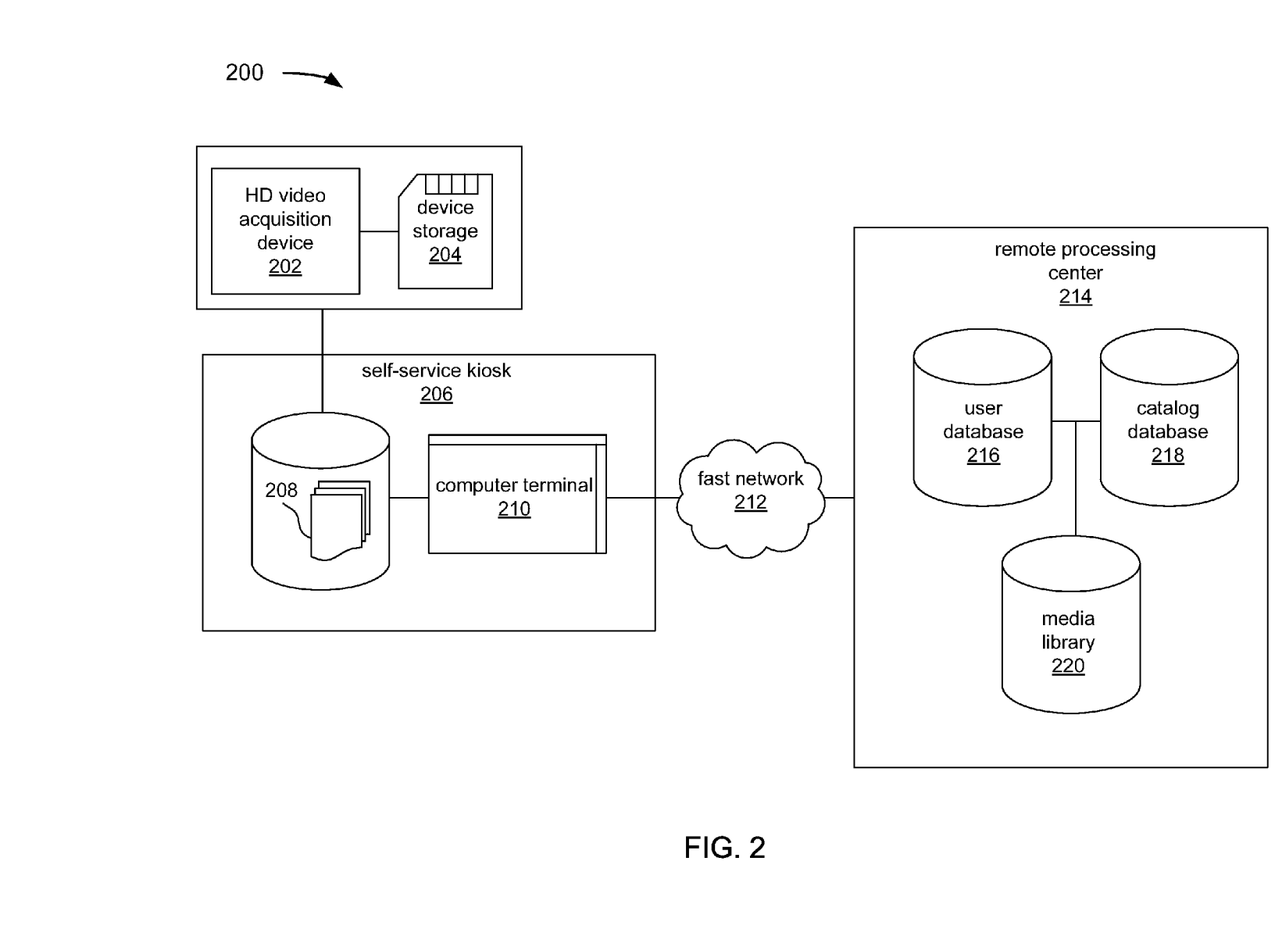
FIG. 2 depicts an example of a system for content submission using a "Self-service kiosk" content submission method from the HD video acquisition device to the remote processing center.

FIG. 2 depicts an example of a system for content submission using a "Self-service kiosk" content submission method from the HD video acquisition device to the remote processing center. The content submission system 200 includes HD acquisition device 202, device storage 204, self-service kiosk 206, content submission repository 208, computer terminal 210, fast network 212, service provider 214, user database 216, catalog database 218, and media library 220.

In the example of FIG. 2, the content submission method is through a self-service kiosk 206. HD video content may be transferred from HD video acquisition device 202 by inserting device storage 204 into self-service kiosk 206, by means of wireless transmission from HD video acquisition device 202 to self-service kiosk 206, or by inserting portable storage 112, including HD video content, into self-service kiosk 206. Content submission repository 208, as described above with reference to FIG. 1, may be created prior to, during, or after submission of the HD video content to self-service kiosk 206.

In one embodiment, the self-service kiosk 206 may be directly connected with the remote processing center 214 via a fast network 212. The fast network 212 may have dedicated and high speed network connection that allows a large amount of data to be fast and directly transmitted to the processing center 214. Further, this submission method, which is based on multiple kiosks 206 strategically located at various convenient locations for uploading media content, allow HD video contents to be quickly and conveniently uploaded without relying on other submission methods that have limited network bandwidth. Thus, the self-service kiosk 206 and the fast network 212 provide a submission method that bypasses and is separated from the conventional content uploading mechanisms.

In the example of FIG. 2, computer terminal 210 provides means for a user to register the HD video content with service provider 214, and may enable the user to select presentation, processing, and/or editing of the HD video content by service provider 214. HD acquisition device 202, device storage 204, content submission repository 208, service provider 214, user database 216, catalog database 218, and media library 220 have similar functions to corresponding components as described above with reference to FIG. 1.

Figure 3:
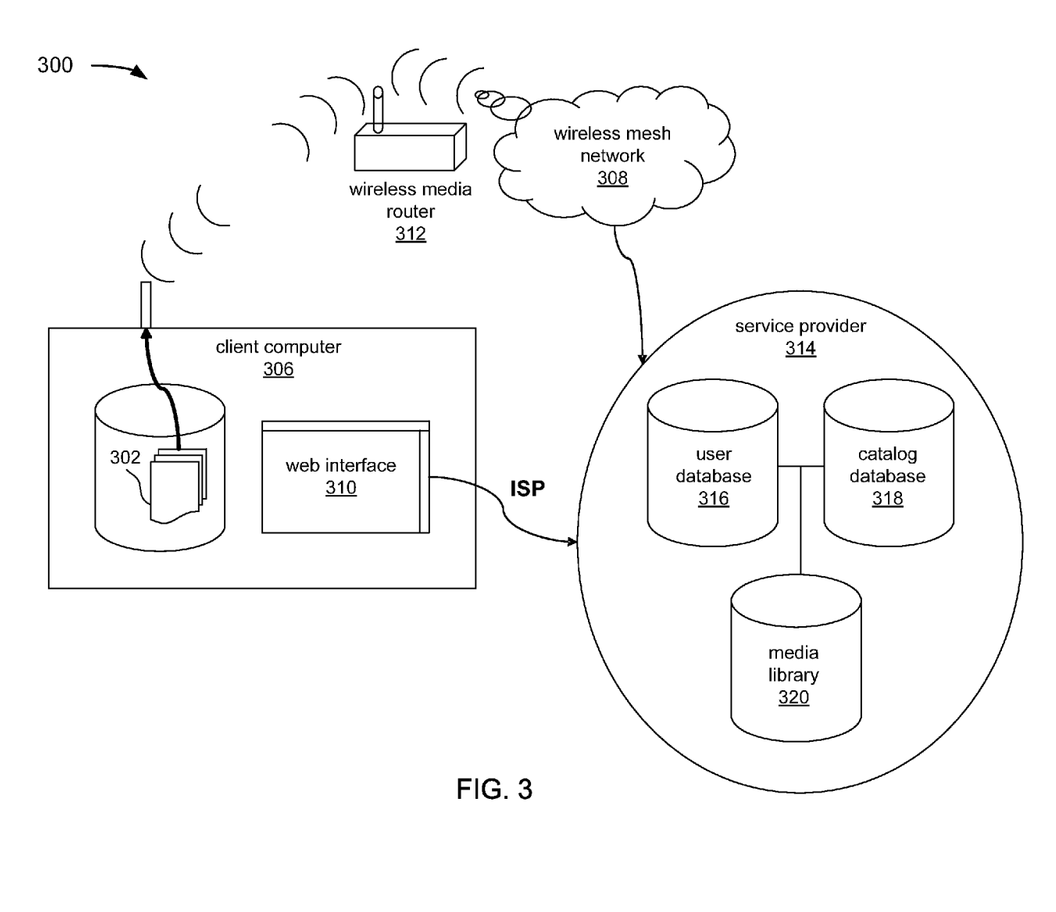
FIG. 3 depicts an example of a system for content submission using a "Direct upload" content submission method, from the HD video acquisition device to the remote processing center.

FIG. 3 depicts an example of a system for content submission using a "Direct upload" content submission method, from the HD video acquisition device to the remote processing center/service provider. The content submission system 300 includes HD video content 302, client computer 306, wireless mesh network 308, web interface 310, wireless media router 312, service provider 314, user database 316, catalog database 318, and media library 320. Wireless mesh networks are networks consisting of a plurality of wireless nodes, where the data hops from one node to the next, until reaching a suitable broadband internet connection such as a fiber-optic network link (also called portal point). In addition, the wireless mesh network bypasses the conventional network connection provided by ISP, and may in one embodiment, serve as a fast and reliable media content submission method in delivering the HD video contents to the service provider 314.

In one embodiment, the wireless mesh network may be implemented using the emerging 802.11s standard which is based on 802.11 (Wi-Fi). 802.11s wireless mesh network devices implement technology that addresses such problems like throughput degradation, congestion, security and other functions. In another embodiment, the wireless mesh network devices may utilize "White Spaces". The Federal Communication Commission's (FCC) recent decision to approve new uses of a range of underused and, as a result of the switch to digital TV newly vacated frequencies between 512 and 698 Mhz, will make these so-called "White Spaces" the natural successor to Wi-Fi, due to its wider range and lower latency communication capabilities, and better penetration capabilities of the lower-frequency RF signals used.

In the example of FIG. 3, HD video content 302 may be directly uploaded from client computer 306 to service provider 314 through wireless mesh network 308. Wireless media router 312 may contain a System-on-a-chip (SoC) media processor, configured for on-the-fly conversion (transcoding) of the original full-resolution HD video content 302 into formats for different applications (e.g.: streaming, downloading). Such transcoding reduces the file size, so it can be more efficiently transferred. Transcoding may furthermore, be implemented using a high-end GPU (graphics processing unit) based video card residing in the media router device.

In the example of FIG. 3, wireless media router 312 may include client software, allowing the media router to download HD video content over a wireless mesh network, or via a suitable broadband connection. In another embodiment of the invention, the media router may incorporate file transfer optimization software for fast network file transfer. Both upload and download of HD video content over wireless mesh network 308 are independent of the user's internet service provider (such as cable or DSL ISP) and related data transfer limits. The media router device may be set up at the user's home location as part of the wireless home network. In one embodiment, HD video content 302 may be transferred to service provider 314 using a fast broadband connection, such as, in a non-limiting example, a fiber-optic network. It is foreseeable that the media router device described above can be implemented in a very compact way, such as a chip set on a circuit board. This will allow the device to be easily integrated with other devices such as those prevalent in the "digital living room", for example, HDTV sets, gaming consoles, set-top boxes, but also mobile devices such as laptop computers, hand-held mobile devices such as smart phones, etc.

Figure 4:
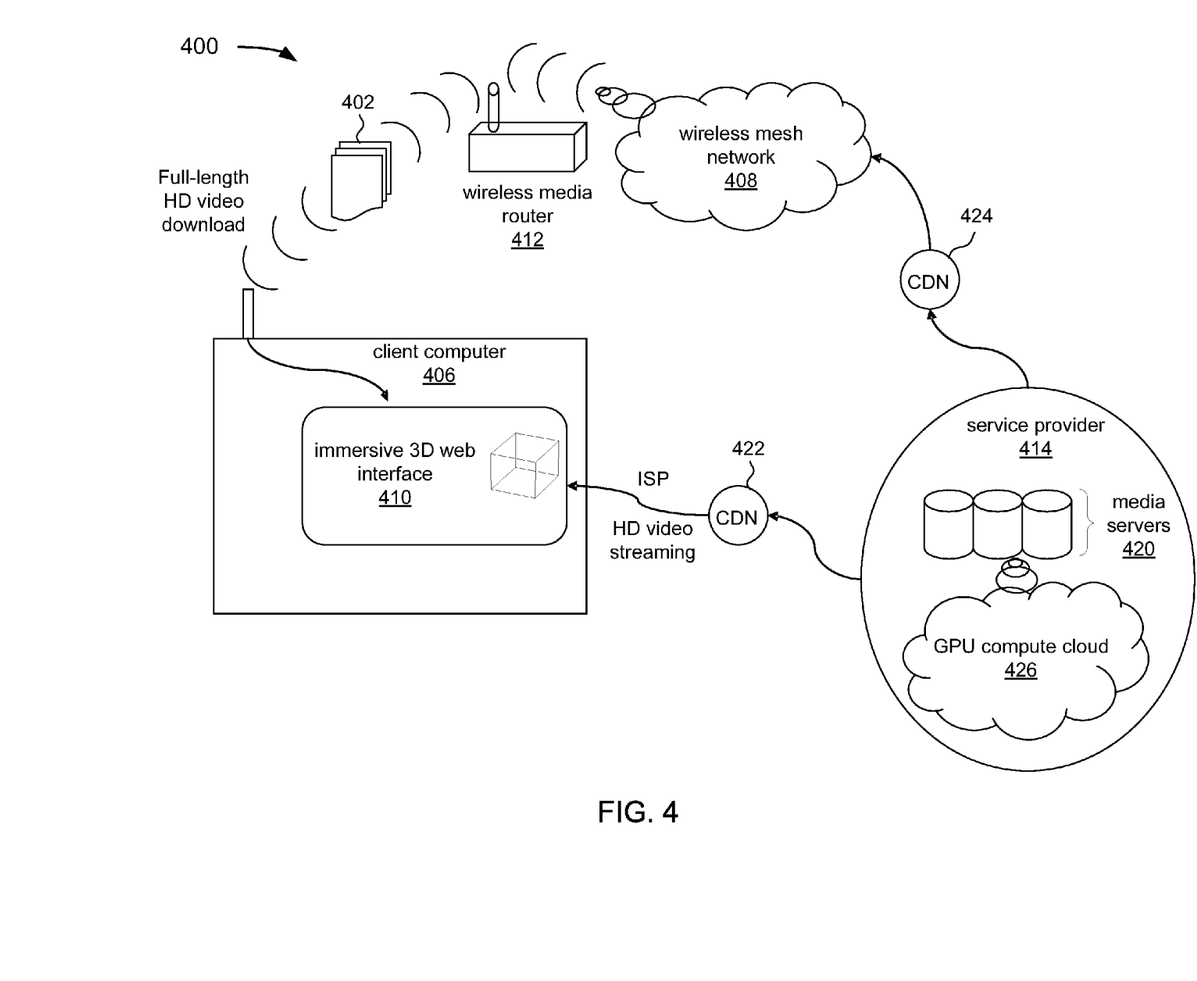
FIG. 4 depicts an example of a system for HD video content distribution over a network.

FIG. 4 depicts an example of a system for HD video content distribution using a Mesh network for HD video downloading and distributing. Distribution system 400 includes HD video content 402, client computer 406, wireless mesh network 408, immersive 3D web interface 410, wireless media router 412, service provider 414, media servers 420, content delivery network for streaming 422, content delivery network for downloading 424, and GPU compute cloud 426 for performing media content post-processing.

In the example of FIG. 4, immersive 3D web interface 410 is a rich media interface that allows the HD media content to be displayed along with advertisements, news, and other commercial information in an non-intrusive way. Immersive 3D web interface 410 may be provided on high definition capable display devices configured to be connected to the internet. These display devices may be next-generation widescreen, high-definition displays, such as general purpose computers or HDTV sets connected to the internet. In a non-limiting example, immersive 3D web interface 410 may run in an internet browser window or as a separate application. Immersive 3D web interface 410 may provide a graphics-intensive presentation of content, such as, for example, in a 3D virtual world.

Immersive 3D web interface 410 may provide search capabilities for a user to search for HD video contents available from service provider 414. A search may be performed by means such as a search box (for search terms) or through a content recommendation system such as a ranking engine or a content discovery engine driven by collaborative user input.

HD video content 402 may be presented in immersive 3D web interface 410, along with related content (e.g.: user blog articles, links), and/or advertisement. The video content may be streamed (such as for preview) and/or selected for download. Immersive 3D web interface 410 may provide customization of presentation of HD video content 402. For example, customization may enable a user to view the content as a plain 3D video wall, or a more virtual-world/game like environment with more elements for multi-user interaction. A given 3D scene may be utilized as a template for content presentation, eliminating the need for computing-intensive rendering (rendering-on-the-fly).

Immersive 3D web interface may enable advertisement to be presented contextually in a non-obtrusive manner along with HD video content 402. In a non-limiting example, advertisement may be inserted into a 3D scene on-the-fly, without requiring HD video content 402 and the advertisement to be re-rendered into a 3D scene. The advertisement may be presented in the form of a virtual billboard. Alternatively, the advertisement may be rendered and displayed surrounding, or along the side of the HD video screen in an immersive 3D interface. In one embodiment, common web technologies, such as AJAX or LAMP stack, may be used to build the type of rich, dynamic user experience desired by consumers, such as web interface 110, as described above with reference to FIG. 1.

Large file size multimedia data, such as HD video content 402, may be stored in and managed by media server 420. The media library stored in media servers 420 can be searched and media library content may be accessed by users. Access to parts or all of the media library may be restricted to only users with appropriate permissions. In one embodiment, a software- and/or hardware-based user access control for some media assets in the media library is provided, while other media assets in the library are freely accessible and can be syndicated to other web sites and services through the service provider's web application programming interface (API), or web content syndication methods such as Media RSS (MRSS), or by other means. In another embodiment, the data center of service provider 414 is operated in a closed environment, resides in a physically separated facility, with special physical and software- and hardware-based security mechanisms implemented.

In one embodiment, a massively-parallel, distributed computing architecture may be used for post-processing of media content uploaded to the service provider 414. Post-processing may involve video transcoding, editing, enhancement, and other special-purpose applications (computer-aided diagnosis, image reconstruction). Post-processing may not only involve processing individual data files independently (such as in video transcoding), but also processing subsets of, or the entire media library, such as in video search and data mining applications. Transcoding algorithms may be parallelized and distributed on a multitude of cores or processors. The post-processing task at hand, such as the transcoding algorithm, may be parallelized, meaning that it can be distributed on several or many computing cores (or processors). Those cores typically reside in one machine or computer, thus forming a computing node. The number of cores or processors per node in general-purpose hardware typically ranges from several CPU cores (such as eight, a so-called octocore in a multi-processor PC, or in a gaming console) to several hundred GPU (graphics processing units in high-end graphics cards) streaming processors. Deployment of post-processing tasks to the GPU may utilize special software development tools for the GPU platform, such as CUDA and OpenCL.

One embodiment of the invention utilizes a large number of interconnected nodes that in turn encompass a multitude of GPUs (hundreds or even thousands, or more streaming processors) to work in tandem as a GPU compute cloud 426 residing in the service provider's data center 414, and networked with media servers 420. The cloud computing architecture employed in the embodiment of the invention allows customers, such as corporate customers from the entertainment industry, to access the services provided by the data center 414 (or many thereof), such as transcoding of HD video content 402 to a streamable format, on a per-use basis, and without burdening the customer with technical or infrastructure issues. The embodiment includes a mechanism for metering usage, as well as providing a consistent level of service as demand grows. The consistent level of service may be implemented by utilizing clustering and/or virtualization technologies.

In the example of FIG. 4, HD video content 402 may be transferred from media servers 420 to certain third-party content delivery networks (CDNs), via a high-bandwidth fiber-optic network link, from where they can be further distributed for downloading 424 or direct streaming 422 purposes. In the example of FIG. 4, CDN 424 may transfer HD video content 402 to client computer 406 via wireless mesh network 408. Wireless media router 412 may be used as described above with reference to FIG. 3. In one embodiment, the data submission method described above for submitting media content is separated from, and cannot access the CDN 422 and/or CDN 424. Thus, by using different data submission methods and data distribution mechanisms, a large amount of media content can be efficiently uploaded and distributed, without being restricted by the limited upstream bandwidth provided by common ISPs.

In one embodiment, immersive 3D web interface 410 may be implemented using client and server components, such as OpenSimulator (OpenSim) and libsecondlife. OpenSim is an open source server implementation for hosting virtual worlds, which may be utilized for streaming video into a 3D scene. OpenSim uses libsecondlife to connect to a third-party client application, which in turn displays the immersive 3D environment. However, other 3D engines may be used as well to build such immersive 3D web interface 410.

In another embodiment, immersive 3D web interface 410 may be implemented by means of hardware bridging of a PC interface (e.g., DVI or PCIe) over internet protocol (IP). In this implementation, the entire rich media interface (not only certain rich media components) is transmitted over the network, directly from the service provider 414. No application software needs to be downloaded by the user to display the content onto a high-definition capable display device (e.g., HDTV set). However, the display device needs to be equipped with a special hardware circuitry component that supports hardware bridging over IP. In yet another embodiment, desktop virtualization software may be utilized to transmit the immersive 3D web interface 410 over the network, directly from the service provider 414. In this embodiment, client application software, but no special hardware circuitry component is needed to display the content onto the HD capable display device.

In one embodiment, immersive 3D web interface, may be implemented in a way that it can be controlled with a multi-touch (i.e., driven by more than one finger) interaction device, such as a multi-touch sensitive screen or controller device (e.g., multi-touch remote control).

Figure 5:
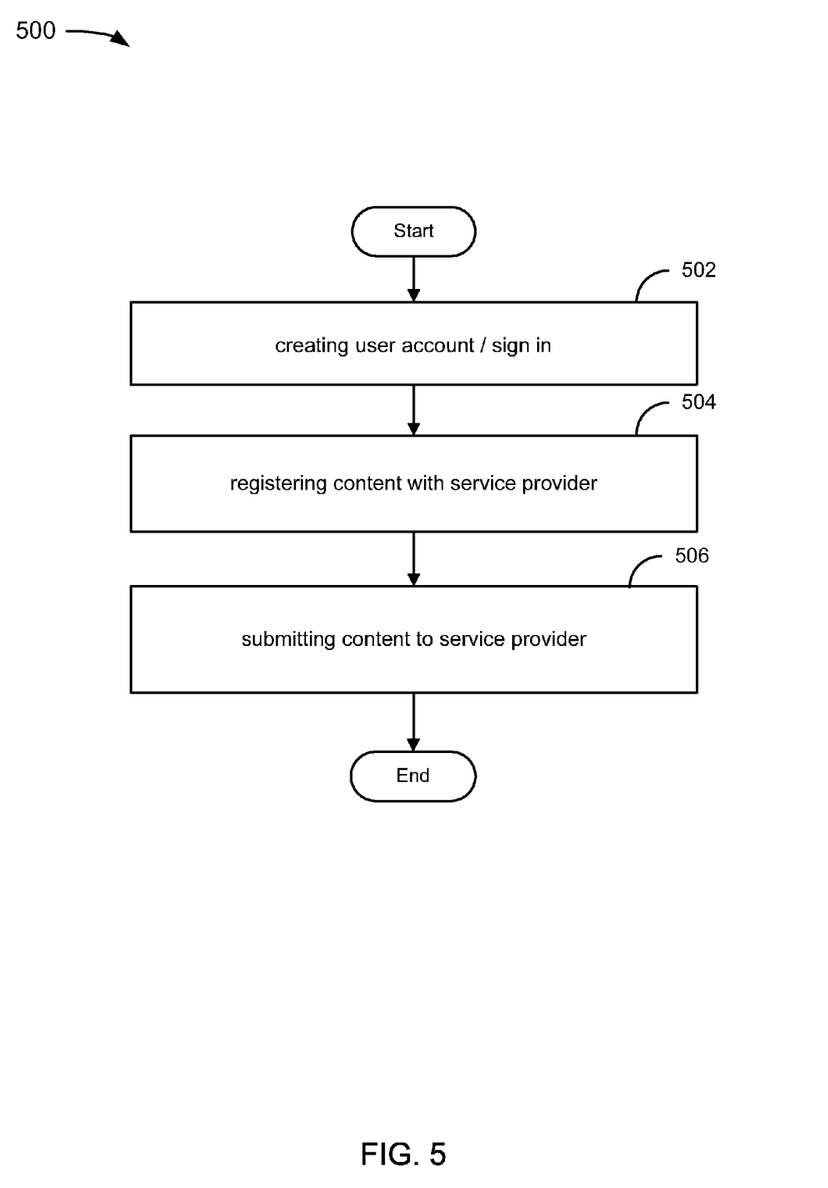
FIG. 5 depicts an example of a flowchart of a method for enabling a user to provide content to the service provider.

FIG. 5 depicts a flowchart 500 of a method for enabling a user to provide content to the service provider. This method and other methods are depicted as serially arranged modules. However, modules of the methods may be reordered, or arranged for parallel execution as appropriate.

In the example of FIG. 5, the flowchart begins at module 502 with creating a user account/signing in. If a user account has already been set up by a user, the user can sign in to use the services provided by the service provider as described with reference to FIG. 1. If no user account has been created, input of certain personal information from the user is required. This information may include the following: user name, password, e-mail address, transaction processing information (for e-commerce, such as physical/shipping address, mobile phone number, payment details), terms-of-service agreement with a service provider, or any combination thereof.

In the example of FIG. 5, the flowchart continues to module 504 with registering content with a service provider. The service provider may request content information about the HD video content to be distributed. Content information may include: identification of files, metadata, content description and genre, user's own ranking of top five movies in submission batch to be featured in user blog, content submission method method/media type used. In one embodiment, the user may complete content submission manifest. A tracking number (airway bill number) and e-airway bill may be generated. The user may print the airway bill (if mail-in method is chosen as a content submission method, as described with reference to FIG. 1). The user may tag the content submission repository (as described with reference to FIG. 1) with airway bill number and include e-airway bill (manifest).

In one embodiment, the user may select available free or paid-for content presentation/design templates, such as video rendering templates with various options, transitions, and special effects. The user may input and preview customized information for selected template, such as title, font, color, and credits. In one embodiment, the user may select one or more CDNs, as described with reference to FIG. 4, for content distribution, such as streaming or download.

In one embodiment, the user may order additional items such as return DVD/Blu-ray disc (BD), or personalized discs shipped to friends and family. These discs may contain a processed and/or edited version of the HD video content sent by the user to the service provider.

In the example of FIG. 5, the flowchart continues to module 506 with submitting content to service provider. The tagged content submission repository may be shipped or otherwise transferred to the service provider, depending on the content submission method (mail-in of portable storage media, self service kiosk, or direct upload). In one embodiment, the content registration information submitted by module 504 may be transmitted via a first submission method that is separate and different from the second submission method utilized by module 506 in submitting the media content. As described above, the various approaches utilized by the second content submission method allow HD video contents to be quickly uploaded to the service provider, bypassing the first submission method which has limited upload bandwidth.

Figure 6:
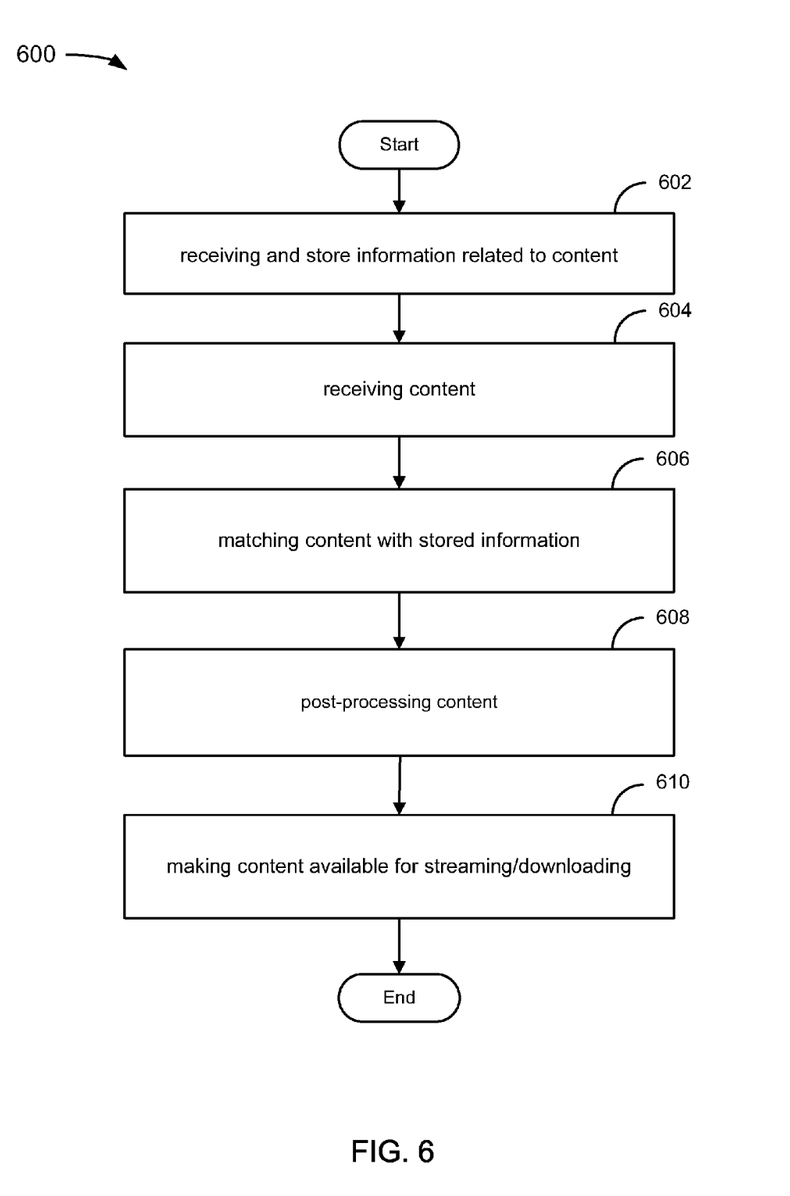
FIG. 6 depicts an example of a flowchart of a method for processing the HD video content at the service provider.

FIG. 6 depicts a flowchart 600 of a method for processing the HD video content at the service provider. This method and other methods are depicted as serially arranged modules. However, modules of the methods may be reordered, or arranged for parallel execution as appropriate.

In the example of FIG. 6, the flowchart begins with module 602 with receiving and storing information related to HD video content. The information may include: identification of files, metadata, content description and genre, user's own ranking of top five movies in submission batch to be featured in user blog, content submission method method/media type used, or manifest, or any combination thereof, as described in reference to FIG. 5.

In the example of FIG. 6, the flowchart continues to module 604 with receiving HD video content. The content may be received through one of many content submission methods. These may include, but are not limited to, mail-in, self-service kiosk, or direct upload. In one embodiment, the content submission methods of the module 604 are separated from and bypassing the content submission method of the module 602.

In the example of FIG. 6, the flowchart continues to module 606 with matching HD video content with stored information. The service provider may match the tag (airway bill number) and manifest (airway bill) with information stored on the server.

In one embodiment, an initial Quality Assurance (QA) may be performed on the HD video content. Upon successful completion of the initial QA, the service provider may auto-generate/update a catalog entry of a catalog database on the service provider's server. Such initial quality assurance ensures that the media content received by the service provider can be further processed. Further, upon a determination that the uploaded media content has a quality that is below a pre-determined threshold, the service provider may restrict the further distributing of the convent, or request the defective media content to be re-submitted. The quality threshold may be determined based on a set of pre-determined criteria. For example, the service provider may determine that the media content is not in the correct format, below the requisite resolution, or has insufficient quality, etc.

In the example of FIG. 6, the flowchart continues to module 608 with post-processing the HD video content. The content may also be edited. A user-selected template may be applied to video content for editing. A full-length, full-resolution HD copy may be stored in a media library on the service provider's server. Transcoding may be performed on the HD video content to change the content to a format suitable for downloading/streaming. For streaming the content may be converted to a compressed streaming video format, such as Flash video. In one embodiment, in-video advertisement may be inserted into the HD video content. In one embodiment, a low-resolution copy for other purposes such as an internal and external review (QA) may be generated. This step requires conversion of full-resolution HD video to lower resolution.

In one embodiment, editorial review steps are performed during QA for elimination of poor or unsuitable content (e.g., content deemed unsuitable for viewing, etc), flagging with editor's rating and updates of the catalog. QA may use third-party reference data and services, for instance, to detect audio and video signatures that may indicate copyright infringement. Thus, once the QA detects that the media content containing copyright protected information, and the service provider may restrict the further access of such media content until the copyright ownership is ascertained.

In the example of FIG. 6, the flowchart continues to module 610 with making the content available for streaming/downloading. The content may have been transcoded to convert the original file to a more suitable format. The content may be available to everyone or may be restricted to users with the right permissions. QA-passed HD video content may be uploaded to user-selected content delivery networks (CDNs) for streaming or download purposes. The media library, catalog information (such as metadata including uniform resource locator, or URL) may be updated for online content sharing. Further, advertisement information may be inserted into the media content during the distribution. The advertisement may either be inserted during the post-processing at module 608, or be added during the distribution process at module 610.

It will be appreciated to those skilled in the art that the preceding examples and embodiments are exemplary and not limiting to the scope of the present disclosure. It is intended that all permutations, enhancements, equivalents, and improvements thereto that are apparent to those skilled in the art upon a reading of the specification and a study of the drawings are included within the true spirit and scope of the present disclosure. It is therefore intended that the following appended claims include all such modifications, permutations and equivalents as fall within the true spirit and scope of the present disclosure.

The invention claimed is:

1. A method for distributing media content on a network, the method comprising:
   receiving, from a client computer by a media server, content description related to the media content via a first submission method, wherein the first submission method allows the content description to be received via the network which incorporates a content delivery network (CDN);
   receiving, from the client computer by the media server, the media content via a second submission method, wherein the second submission method
      allows the media content to be uploaded to the media server via a wireless mesh network connection which is separated from the first submission method,
      cannot be accessed via the first submission method, and
      provides a quicker upload bandwidth to the media server than the first submission method;
   upon matching the content description with the media content, performing, by the media server, quality assurance analysis on the media content;
   upon a determination that the media content has a quality below a predetermined threshold according to pre-specified criteria, restricting, by the media server, the distributing of the media content;
   processing, by the media server, the media content based on the description information, wherein the processed media content is configured to be distributed over the network;
   distributing, by the media server, the processed content via the network which incorporates the CDN;
   monitoring, by the media server, the processing of the media content via the network; and
   presenting, by the media server; the processed media content via an immersive 3D interface.

2. The method of claim 1, wherein the second submission method allows the media content to be received via a self-service kiosk.

3. The method of claim 1, wherein the second submission method bypasses the first submission method during the receiving of the media content.

4. The method of claim 1, wherein the network exhibits a heterogeneous bandwidth constraint having an upstream bandwidth that is lower than a downstream bandwidth.

5. The method of claim 1, wherein said processing of the media content further comprising:
   transcoding the media content; and
   editing the media content.

6. The method of claim 1, wherein the method is embodied in a non-transitory machine-readable medium as a set of instructions which, when executed by a processor, cause the processor to perform the method.

* * * * *